(12) United States Patent
Naqvi et al.

(10) Patent No.: US 9,046,171 B2
(45) Date of Patent: Jun. 2, 2015

(54) METHOD TO CONTROL A HYBRID TRANSMISSION USING ON-OFF SWITCHES CONTROLLING HYDRAULIC FLOW TO A CLUTCH

(75) Inventors: Ali K. Naqvi, White Lake, MI (US); Jean Marie Miller, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 277 days.

(21) Appl. No.: 13/312,777

(22) Filed: Dec. 6, 2011

(65) Prior Publication Data

US 2013/0144497 A1 Jun. 6, 2013

(51) Int. Cl.
| | |
|---|---|
| *B60W 10/02* | (2006.01) |
| *B60W 10/00* | (2006.01) |
| *F16H 61/08* | (2006.01) |
| *G06F 17/00* | (2006.01) |
| *F16H 61/06* | (2006.01) |
| *B60W 30/20* | (2006.01) |
| *F16H 61/04* | (2006.01) |
| *B60W 30/19* | (2012.01) |
| *F16H 61/684* | (2006.01) |
| *F16H 59/46* | (2006.01) |
| *B60W 10/10* | (2012.01) |

(52) U.S. Cl.
CPC ........ *F16H 61/061* (2013.01); *F16H 2059/462* (2013.01); *B60W 30/20* (2013.01); *B60W 10/10* (2013.01); *F16H 2059/465* (2013.01); *F16H 61/0403* (2013.01); *B60W 30/19* (2013.01); *B60W 10/02* (2013.01); *B60W 2510/0241* (2013.01); *F16H 61/06* (2013.01); *F16H 61/08* (2013.01); *F16H 61/684* (2013.01); *F16H 2061/062* (2013.01)

(58) Field of Classification Search
USPC ............. 477/119, 143, 174, 4, 5, 54, 83; 180/336, 339; 192/3.3, 3.57, 85.01, 192/85.63; 475/117, 123, 132; 701/22, 36, 701/51–55, 59, 60, 66–68
See application file for complete search history.

(56) References Cited

U.S. PATENT DOCUMENTS

| | | | | |
|---|---|---|---|---|
| 3,744,347 | A | * | 7/1973 | Kubo et al. ............... 477/119 |
| 4,836,057 | A | * | 6/1989 | Asayama et al. .......... 477/120 |
| 5,216,606 | A | * | 6/1993 | Lentz et al. ................ 701/66 |
| 5,902,344 | A | * | 5/1999 | Eike et al. .................. 701/67 |
| 6,115,661 | A | * | 9/2000 | Hosseini et al. ........... 701/51 |
| 2005/0080540 | A1 | * | 4/2005 | Steinmetz et al. ......... 701/55 |
| 2005/0288153 | A1 | * | 12/2005 | Whitton .................... 477/146 |
| 2006/0089775 | A1 | * | 4/2006 | Whitton et al. ............ 701/51 |
| 2007/0221462 | A1 | * | 9/2007 | Rains ......................... 192/3.3 |
| 2007/0260381 | A1 | * | 11/2007 | Sah ............................ 701/51 |
| 2009/0036265 | A1 | * | 2/2009 | Hwang et al. ............. 477/76 |
| 2009/0105039 | A1 | * | 4/2009 | Sah et al. ................... 477/5 |
| 2009/0111643 | A1 | * | 4/2009 | Sah et al. ................... 477/5 |
| 2009/0111644 | A1 | * | 4/2009 | Kaminsky et al. ........ 477/5 |

(Continued)

*Primary Examiner* — Fadey Jabr
*Assistant Examiner* — Kevin P Mahne

(57) ABSTRACT

A transmission includes a plurality of synchronously operated clutches selectably transmitting torque from a torque generative device to an output member. A method to control the transmission through a shift event includes monitoring a desired shift event including monitoring a clutch to be engaged, determining a time at which the clutch to be engaged will be synchronized, determining a required clutch fill time for the clutch to be engaged, and actuating an on-off hydraulic control switch selectably providing pressurized hydraulic fluid to the clutch to be engaged based upon coordinating the time at which the clutch to be engaged will be synchronized and the required clutch fill time.

12 Claims, 4 Drawing Sheets

(56) References Cited

U.S. PATENT DOCUMENTS

| | | | |
|---|---|---|---|
| 2009/0111645 A1* | 4/2009 | Heap et al. ................. 477/5 |
| 2009/0112422 A1* | 4/2009 | Sah et al. ................. 701/60 |
| 2009/0112429 A1* | 4/2009 | Sah et al. ................. 701/68 |
| 2009/0118930 A1 | 5/2009 | Heap et al. |
| 2010/0114443 A1* | 5/2010 | Terwart et al. ............ 701/68 |
| 2010/0248892 A1* | 9/2010 | Sah ............................. 477/5 |
| 2010/0279816 A1* | 11/2010 | Soliman ...................... 477/3 |
| 2010/0305791 A1* | 12/2010 | Sah et al. .................. 701/22 |
| 2011/0183811 A1* | 7/2011 | Wilke et al. ............ 477/174 |
| 2011/0184612 A1* | 7/2011 | Fujii et al. ................ 701/54 |
| 2011/0315499 A1* | 12/2011 | Fukushiro et al. ....... 192/3.57 |
| 2012/0209461 A1* | 8/2012 | Kaminsky et al. ......... 701/22 |
| 2012/0316738 A1* | 12/2012 | Teslak et al. .............. 701/53 |

* cited by examiner

METHOD TO CONTROL A HYBRID TRANSMISSION USING ON-OFF SWITCHES CONTROLLING HYDRAULIC FLOW TO A CLUTCH

TECHNICAL FIELD

This disclosure is related to control systems for electro-mechanical transmissions.

BACKGROUND

The statements in this section merely provide background information related to the present disclosure. Accordingly, such statements are not intended to constitute an admission of prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque to the driveline. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed. A hydraulic control system is known to provide pressurized hydraulic oil for a number of functions throughout the powertrain.

Operation of the above devices within a hybrid powertrain vehicle require management of numerous torque bearing shafts or devices representing connections to the above mentioned engine, electrical machines, and driveline. Input torque from the engine and input torque from the electric machine or electric machines can be applied individually or cooperatively to provide output torque. Various control schemes and operational connections between the various aforementioned components of the hybrid drive system are known, and the control system must be able to engage to and disengage the various components from the transmission in order to perform the functions of the hybrid powertrain system. Engagement and disengagement are known to be accomplished within the transmission by employing selectively operable clutches.

Clutches are devices well known in the art for engaging and disengaging shafts including the management of rotational velocity and torque transfer between the shafts. Application and release of clutches can be accomplished through hydraulic means and capable of a range of engagement states, from fully disengaged, to synchronized but not engaged, to engaged but with only minimal clamping force, to engaged with some maximum clamping force. The clamping force available to be applied to the clutch determines how much reactive torque the clutch can transmit before the clutch slips.

An hydraulic control system utilizes lines charged with hydraulic oil to selectively activate clutches within the transmission. Hydraulic switches or pressure control solenoids (PCS) can be used to selectively apply pressure within a hydraulic control system. Features within the PCS selectively channel or block hydraulic oil from passing therethrough depending upon the actuation state of the PCS. In a blocked state, a PCS is known to include an exhaust path, allowing any trapped hydraulic oil to escape, thereby de-energizing the connected hydraulic circuit in order to complete the actuation cycle. Modulation of the command pressure can enable the PCS to be linearly, variably actuated, including actuation controlling application of fill pressure to the clutch in order to achieve within the clutch some middle or transient state between full feed and exhaust states. In an exemplary transient state, the PCS, embodied as a variable bleed solenoid (VBS) can be operated with a portion of the hydraulic line pressure being used to maintain a desired clutch pressure, with a remainder of the hydraulic line pressure being bled back into a hydraulic return line.

Use of a PCS includes the use of comparatively heavy and expensive PCS hardware, and additionally, use of hydraulic bleed to maintain a desired or controlled pressure from the PCS returns some hydraulic line pressure that could otherwise be used in the hydraulic control system or could reduce the required output of the hydraulic pump. Use of a PCS can be desirable as it enables a staged fill event, wherein commands to the PCS can take a clutch through multiple stages culminating in the filling and engagement of the clutch. Such a staged process can be required to compensate for variables in the system, for example, hardware and a temperature of the hydraulic fluid, and to provide for smooth engagement of the clutch. According to one exemplary embodiment, it can be desirable to fill the clutch to a touching state, wherein a hydraulic cylinder of the clutch is filled with hydraulic fluid and just enough pressure is applied to the clutch plates such that the plates are made to touch without any clamping force being applied to the clutch plates. According to one embodiment, such a touching state can be used to compress overall timing of a transmission shift, enabling the clutch fill to occur to the touching state prior to the clutch being synchronized or being brought to a same speed. However, if clutch control can effectively be achieved without use of a PCS, weight, cost, and efficiency of the hydraulic control system can be improved.

An hydraulically actuated clutch operates by receiving pressurized hydraulic oil into a clutch volume chamber. Hydraulic oil in this clutch volume chamber exerts pressure upon features within the volume chamber. A piston or similar structure is known to be utilized to transform this hydraulic pressure into an articulation, for example a translating motion or compressing force. In an exemplary hydraulically actuated clutch, pressurized hydraulic oil is used to fill a clutch volume chamber and thereby displace a clutch piston in order to selectively apply a compression force to the connective surfaces of the clutch. A restoring force, for example as provided by a return spring, is known to be used to counter the compressive force of the hydraulic oil. As described above, clutches are known to be engaged through a range of engagement states. An exemplary clutch with all hydraulic pressure removed can be in an unlocked state. An exemplary clutch with maximum hydraulic pressure can be in a locked state. An exemplary clutch wherein the plates of the clutch have been brought to the same speed but a clamping force has not yet been applied to the clutch plates can be in a synchronized state.

An engagement of a clutch, accomplished through a clutch fill event, is known to be accomplished as rapidly as possible, with some minimum hydraulic pressure being maintained to assure rapid flow of the hydraulic oil into the clutch volume. However, rapid engagement of a clutch can cause a perceptible bump in the vehicle and cause shortened life of the component involved. A shock absorbing device can be utilized to dampen the force of the rapid fill of the clutch volume chamber upon the clutch. For example, a wave plate including a spring feature can be used between the cylinder piston and the clutch to absorb rapid increases in hydraulic pressure. The touching state described above can be defined as the clutch filled with enough hydraulic oil to cause zero force contact of the wave plate.

SUMMARY

A transmission includes a plurality of synchronously operated clutches selectably transmitting torque from a torque generative device to an output member. A method to control the transmission through a shift event includes monitoring a desired shift event including monitoring a clutch to be engaged, determining a time at which the clutch to be engaged will be synchronized, determining a required clutch fill time for the clutch to be engaged, and actuating an on-off hydraulic control switch selectably providing pressurized hydraulic fluid to the clutch to be engaged based upon coordinating the time at which the clutch to be engaged will be synchronized and the required clutch fill time.

BRIEF DESCRIPTION OF THE DRAWINGS

One or more embodiments will now be described, by way of example, with reference to the accompanying drawings, in which.

DETAILED DESCRIPTION

Figure 1:
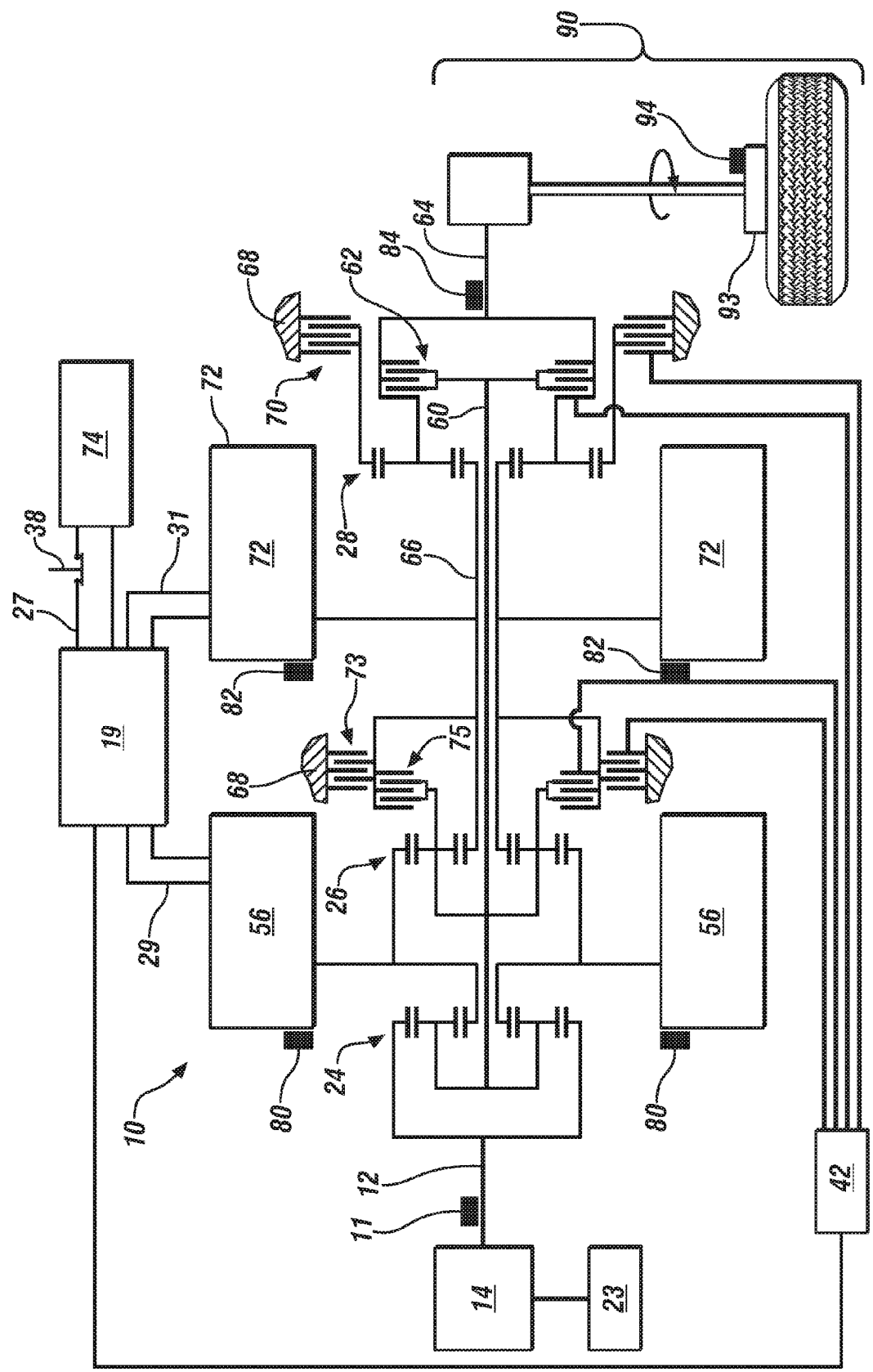
FIG. 1 is a schematic diagram of an exemplary powertrain, in accordance with the present disclosure.
Figure 2:
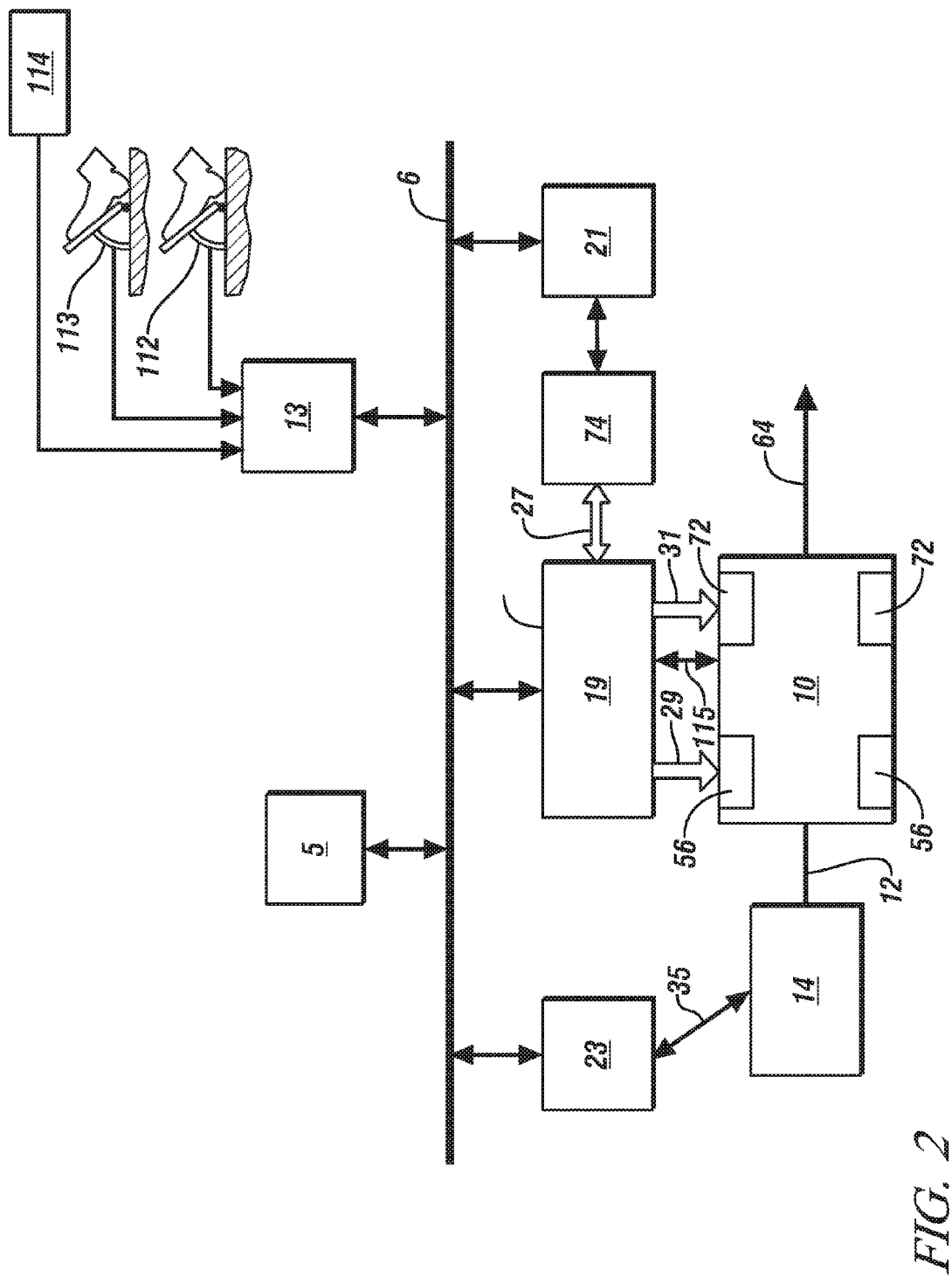
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, including a two-mode, compound-split, electro-mechanical hybrid transmission 10 operatively connected to an engine 14 and first and second electric machines (MG-A) 56 and (MG-B) 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 includes a multi-cylinder internal combustion engine selectively operative in several states to transmit torque to the transmission 10 via an input shaft 12, and can be either a spark-ignition or a compression-ignition engine. The engine 14 includes a crankshaft operatively coupled to the input shaft 12 of the transmission 10. A rotational speed sensor 11 monitors rotational speed of the input shaft 12. Power output from the engine 14, including rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump and/or a torque management device.

The exemplary transmission 10 includes three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission power inverter control module (TPIM) 19, is operative to control clutch states. Clutches C2 62 and C4 75 preferably include hydraulically-applied rotating friction clutches. Clutches C1 70 and C3 73 preferably include hydraulically-controlled stationary devices that can be selectively grounded to a transmission case 68. Each of the clutches C1 70, C2 62, C3 73, and C4 75 is preferably hydraulically applied, selectively receiving pressurized hydraulic oil via the hydraulic control circuit 42.

The first and second electric machines 56 and 72 preferably include three-phase AC machines, each including a stator and a rotor, and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably includes a variable reluctance device including a resolver stator and a resolver rotor. The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to TPIM 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle, to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters and respective motor control modules configured to receive the torque commands and control inverter states therefrom for providing motor drive or regeneration functionality to meet the commanded motor torques $T_A$ and $T_B$. The power inverters include known complementary three-phase power electronics devices, and each includes a plurality of insulated gate bipolar transistors for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter include a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (ECM) 23, a battery pack control module (BPCM) 21, and the TPIM 19. A hybrid control module (HCP) 5 provides supervisory control and coordination of the ECM 23, the BPCM 21, and the TPIM 19. A user interface (UI) 13 is operatively connected to a plurality of devices through which a vehicle operator controls or directs operation of the electro-mechanical hybrid powertrain. The devices include an accelerator pedal 113 (AP) from which an operator torque request is determined, an operator brake pedal 112 (BP), a transmission gear selector 114 (PRNDL), and a vehicle speed cruise control. The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (LAN) bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface (SPI) bus.

The HCP 5 provides supervisory control of the powertrain, serving to coordinate operation of the ECM 23, TPIM 19, and BPCM 21. Based upon various input signals from the user interface 13 and the powertrain, including the ESD 74, the HCP 5 generates various commands, including: the operator torque request ($T_{O\_REQ}$), a commanded output torque ($T_{CMD}$) to the driveline 90, an engine input torque command, clutch torques for the torque-transfer clutches C1 70, C2 62, C3 73, C4 75 of the transmission 10; and the torque commands for the first and second electric machines 56 and 72, respectively. The TPIM 19 is operatively connected to the hydraulic control circuit 42 and provides various functions including monitoring various pressure sensing devices and generating and communicating control signals to various solenoids thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TPIM 19 is operatively connected to the transmission 10 and communicates signals 115 to and from transmission 10. TPIM 19 monitors inputs from sensors to determine states of transmission operating parameters. The TPIM 19 generates and communicates command signals to control the transmission 10, including controlling the hydraulic control circuit 42. Inputs from the TPIM 19 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TPIM 19 to the HCP 5 for control purposes. The TPIM 19 monitors inputs and selectively actuates pressure control devices of the hydraulic control circuit 42 to selectively actuate the various clutches C1 70, C2 62, C3 73, and C4 75 to achieve various transmission operating range states, as described hereinbelow.

The BPCM 21 is signally connected to sensors to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Methods disclosed herein a performed within a control module or control modules within or accessible by the vehicle. Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The exemplary powertrain selectively operates in one of several operating range states that can be described in terms of an engine state including one of an engine on state (ON) and an engine off state (OFF), and a transmission state including a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON (MI_Eng_On) or OFF (MI_Eng_Off). A second continuously variable mode, i.e., EVT Mode II, or MII, is selected by applying clutch C2 62 only to connect the shaft 60 to the carrier of the third planetary gear set 28. The engine state can be one of ON (MII_Eng_On) or OFF (MII_Eng_Off). For purposes of this description, when the engine state is OFF, the engine input speed is equal to zero revolutions per minute (RPM), i.e., the engine crankshaft is not rotating. A fixed gear operation provides a fixed ratio operation of input-to-output speed of the transmission 10, i.e., $N_I/N_O$, is achieved. A first fixed gear operation (FG1) is selected by applying clutches C1 70 and C4 75. A second fixed gear operation (FG2) is selected by applying clutches C1 70 and C2 62. A third fixed gear operation (FG3) is selected by applying clutches C2 62 and C4 75. A fourth fixed gear operation (FG4) is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

The powertrain of FIG. 1 requires a main hydraulic pump and/or an auxiliary hydraulic pump. A main pump can be driven off the input shaft 12 from the engine 14, and an auxiliary pump can be controlled by the TPIM 19 to provide pressurized fluid to the hydraulic control circuit 42. The auxiliary pump can be an electrically-powered pump of an appropriate size and capacity to provide sufficient flow of pressurized hydraulic oil into the hydraulic control system when operational. The hydraulic control system selectively distributes hydraulic pressure to a plurality of devices, wherein an exemplary system can include the torque-transfer clutches C1 70, C2 62, C3 73, and C4 75, active cooling circuits for the first and second electric machines 56 and 72, and a base cooling circuit for cooling and lubricating the transmission 10. As previously stated, the TPIM 19 actuates the various clutches to achieve one of the transmission operating range states through selective actuation of hydraulic circuit flow control devices.

Use of the main pump and auxiliary pump can be determined based upon which of engine 14 and the electric machines are currently being used and in what capacity. For example, if engine 14 is not operating, the main pump is turned off and any required hydraulic line pressure required by the hydraulic control system must be provided by the auxiliary pump. If engine 14 is running, the main pump can be more efficient than the auxiliary pump, and the auxiliary pump can be shut down. If a high line pressure is required, for example, to provide maximum cooling to the electric machines while maintaining a locked clutch or clutches, then both the main pump and the auxiliary pump can simultaneously be used.

The hydraulic control system can include a base cooling circuit for providing hydraulic oil to cool the stators of the first and second electric machines 56 and 72. Active cooling of stators for the first and second electric machines 56 and 72 can be effected by selective actuation of flow control devices, which lead to flow of hydraulic oil around the selected stator and permits heat to be transferred therebetween, primarily through conduction.

In operation, a transmission operating range state, i.e. one of a fixed gear and continuously variable mode operations, is selected for the exemplary transmission 10 based upon a variety of operating characteristics of the powertrain. This includes the operator torque request, typically communicated through inputs to the UI 13 as previously described. Additionally, a demand for output torque is predicated on external conditions, including, e.g., road grade, road surface conditions, or wind load. The operating range state may be predicated on a powertrain torque demand caused by a control module command to operate of the electrical machines in an electrical energy generating mode or in a torque generating mode. The operating range state can be determined by an optimization algorithm or routine operable to determine an optimum system efficiency based upon the operator torque request, battery state of charge, and energy efficiencies of the engine 14 and the first and second electric machines 56 and 72. The control system manages the input torques from the engine 14 and the first and second electric machines 56 and 72 based upon an outcome of the executed optimization routine, and system optimization occurs to improve fuel economy and manage battery charging. Furthermore, the operation can be determined based upon a fault in a component or system.

Referring to FIG. 1, one having skill in the art will appreciate that activation and deactivation of the various clutches C1-C4 will provide a variety of operating range states for use by the powertrain. The exemplary configuration of FIG. 1, the specific exemplary arrangement of planetary gear sets, shafts, and clutches is provided as an example of how a hybrid powertrain can be configured. It is noted that FIG. 1 includes the engine 14, electric machine 56, and electric machine 72 each providing torque independently to the transmission 10 through distinct and independent inputs. By enabling the different torque generative devices to have separate inputs, the transmission 10 includes more degrees of freedom. According to one exemplary embodiment, clutches C1-C4 can be operated synchronously, wherein the plates of the clutch are brought to a zero slip condition before the clutch is engaged. By having independent inputs to the transmission, the engine 14 can be providing or maintaining drive torque to the wheels of the vehicle through a first engaged clutch, while one of the electric machines provides to torque to a shaft internal to transmission 10 to accomplish a synchronized clutch shift in a second clutch. A number of alternative powertrain configurations can be utilized with the methods disclosed herein. According to one exemplary embodiment, two motors can each independently provide torque to a transmission, while an engine selectably engages to one of the motors to provide additional drive torque.

Figure 4:
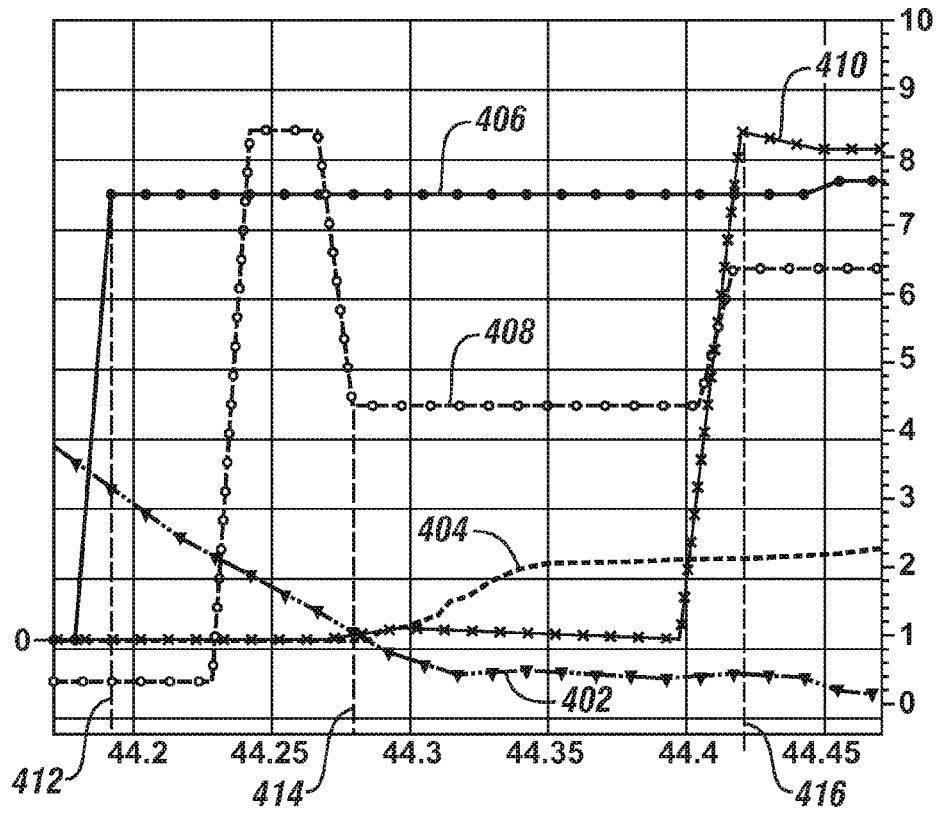
FIG. 4 is a graph illustrating various parameters through an exemplary shift event, in accordance with the present disclosure.

FIG. 4 schematically illustrates an exemplary clutch control circuit utilizing a hydraulically activated pressure control switch, in accordance with the present disclosure. Clutch control circuit 200 includes hydraulically actuated on-off hydraulic control switch 205, hydraulically actuated clutch 300, and hydraulic lines 202, 204, 206, and 208. On-off hydraulic control switch 205 is a binary on-off flow control device, activated by selective application of pressure through hydraulic line 202. If line 202 provides pressurized hydraulic fluid, then plunger 224 within on-off hydraulic control switch 205 is moved to a right position within cavity 210 by the pressure applied by the fluid from line 202 upon plunger 224 creating a force to compress return spring 230. If line 202 does not provide pressurized hydraulic fluid, then plunger 224 within on-off hydraulic control switch 205 is moved to a left position by a force acting upon plunger 224 from return spring 230. Plunger 224 includes details which control a flow of pressurized hydraulic fluid to and from clutch 300. In the exemplary right position, pressurized hydraulic fluid from hydraulic line 204 is channeled by plunger 224 into hydraulic line 208. In the exemplary left position, fluid from hydraulic line 208 is channeled by plunger 224 to flow to exhaust line 206 to a hydraulic return line back to the pumps. By selectively actuating on-off hydraulic control switch 205, hydraulic flow to and from clutch 300 can be controlled. On-off hydraulic control switch 205 is illustrated as a hydraulically actuated device, but other embodiments of an on-off hydraulic control switch are equally applicable to the methods disclosed herein, such as an electromechanical flow control solenoid controlling a hydraulic flow to the clutch and a servo motor controlling a hydraulic flow to the clutch, and the disclosure is not intended to be limited to the particular exemplary embodiments provided herein.

Figure 3:
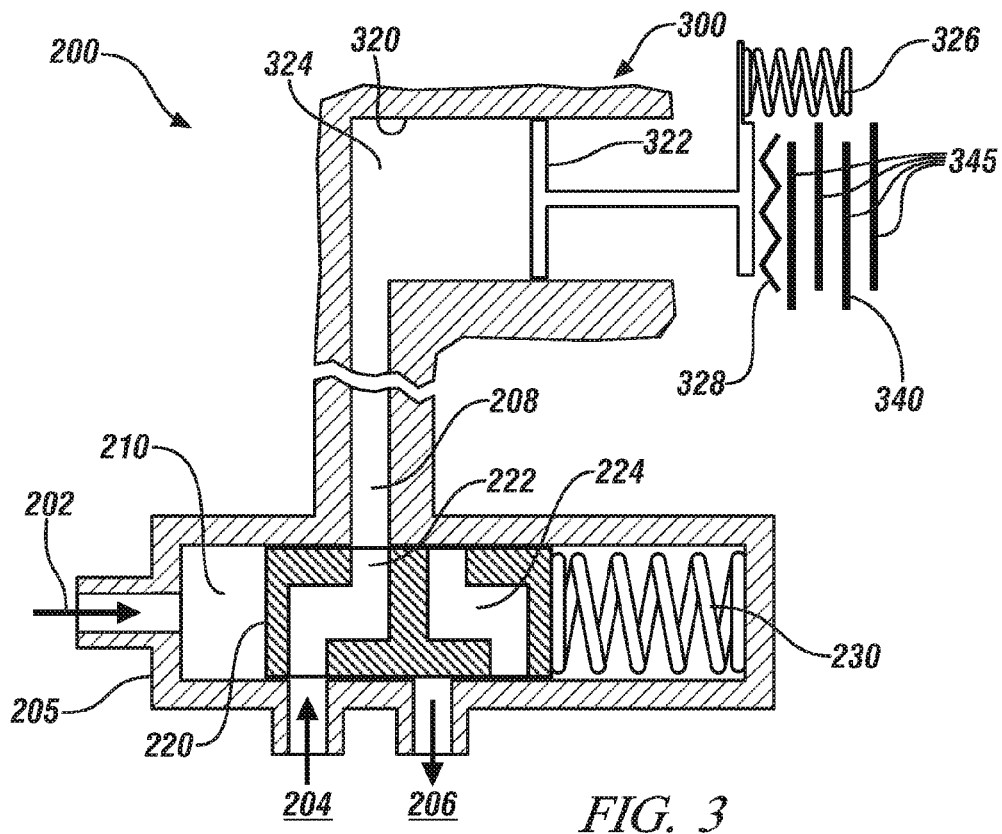
FIG. 3 schematically illustrates an exemplary clutch control circuit utilizing a hydraulically actuated on-off hydraulic control switch, in accordance with the present disclosure.

A hydraulically actuated clutch utilizes selectively actuated pressurized hydraulic flow to create a desired motion or compression. An exemplary clutch operates by receiving pressurized hydraulic oil into a clutch volume chamber. Clutch assembly 300 illustrated in FIG. 3 includes a clutch cylinder 320 and a mechanical clutch 340. Clutch cylinder 320 includes a piston 322 and a clutch volume chamber 324. Pressurized hydraulic fluid enters clutch volume chamber 324 through hydraulic line 208. Hydraulic oil in clutch volume chamber 324 exerts pressure upon features within the volume chamber. Piston 322 transforms the fill pressure exerted by the hydraulic fluid into a force. The force transmitted through piston 322 is used to articulate mechanical clutch 340 between a disengaged state and an engaged state. During the transition between the states, a touching state can be defined wherein clutch volume chamber 324 is filled, but no pressure is yet exerted upon mechanical clutch 340 Positive hydraulic pressure is used to fill the clutch volume chamber 324 and move piston 322 in one direction. As will be appreciated by one having ordinary skill in the art, evacuation of hydraulic oil from clutch volume chamber 324 acts in some degree to move piston 322 in the other direction, but cavitation limits the ability of low pressure hydraulic fluid from effectively moving piston 322. As a result, return spring 326 is utilized to provide force to move piston 322 in the direction opposite to the direction achieved through the application of pressurized hydraulic fluid.

Mechanical clutch 340 is selectively actuated by the transmission of force through piston 322. Mechanical clutch 340 includes clutch connective surfaces in the form of clutch plates 345. Clutch plates 345 are connected to rotating members within the transmission. When mechanical clutch 340 is not actuated, clutch plates 345 are kept separate. Spinning of some fraction of clutch plates 345 does not cause spinning of the remaining fraction of clutch plates 345. When mechanical clutch 340 is actuated, clutch plates 345 are brought into contact with neighboring plates, and sufficient frictional forces between clutch plates 345 creates a locked relationship wherein the plates move in unison. Between rotating objects applying a torque, the torque capacity ('$T_C$') generated between the objects can be determined by the following equation:

$$T_C = 2/3 * f * F_A \quad [1]$$

wherein f is the coefficient of friction between the rotating objects, $F_A$ is the axial force applied normally to direction of rotation of the objects, and $F_A$ in mechanical clutch 340 is generated by compressive force transmitted through piston 322.

As will be appreciated by one having ordinary skill in the art, f changes depending upon whether there is relative movement between the two objects. When the clutch is in a touching state, $F_A$ is kept at substantially zero, yielding zero torque capacity.

A method to model hydraulic flow affecting operation of a clutch is disclosed in commonly assigned and co-pending U.S. application Ser. No. 12/251,416, which is incorporated herein by reference. A correlation between hydraulic pressure in a clutch and achieving a touching state within the clutch is disclosed in commonly assigned and co-pending U.S. application Ser. No. 12/250,514, which is incorporated herein by reference. A method to determine parameters a synchronous shift including a time at which the plates of the clutch will be synchronized is disclosed in commonly assigned and co-pending U.S. application Ser. No. 12/250,250, which is incorporated herein by reference.

A PCS or VBS can be used to precisely control pressure within a hydraulically actuated clutch through a synchronous shift, permitting the shift to be executed in stages. Such discreet staged events prevent adverse affects to drivability of the vehicle as a result of the shift, for example, locking the clutch plates prior to the plates being synchronized. However, accurate computational modeling of the clutch in combination with an accurately estimable time can permit actuation of the on-off hydraulic control switch controlling hydraulic flow at a time coordinated with the synchronization of the clutch. If the clutch is filled such that the clutch is synchronized before or simultaneously to the clutch being filled, the staged fill events enabled by use of a PCS embodied as a VBS are unnecessary. A method is disclosed to control a transmission through a shift event wherein a time at which the clutch to be engaged will be synchronized is determined, a required clutch fill time for the clutch is acquired or determined, and an on-off hydraulic control switch selectably providing pressurized hydraulic fluid to the clutch is actuated based upon coordinating the time at which the clutch to be engaged will be synchronized and the required clutch fill time, such that the clutch is synchronized before or simultaneous to the clutch being filled. The time at which the clutch to be engaged will be synchronized can be calculated, estimated, or modeled according to any method sufficient to accurately estimate powertrain operation. In one embodiment, the time can be provided by a control module controlling the powertrain and transmission through the shift event. Once the clutch is synchronized and the clutch is filled, the on-off hydraulic control switch can be maintained in a state providing pressurized fluid to the clutch, increasing through a remainder of the clutch shift event a clutch torque capacity of the clutch. Once a minimum required clutch torque capacity is achieved, the clutch is engaged and torque can be transferred through the clutch. A number of embodiments of the method are envisioned, and the disclosure is not intended to be limited to the particular exemplary embodiments provided herein. The minimum required clutch torque capacity can be any value indicating that the clutch has transitioned or nearly transitioned to a desired engaged state, such that the clutch can transfer torque with little or no slip.

FIG. 4 is a graph illustrating various parameters for a clutch through an exemplary shift event. Plot 402 illustrates slip or relative plate speed in the clutch, with the horizontal axis providing a time in seconds for the illustrated test and with a zero line being defined by the right vertical axis. At the outset of the test, the clutch includes a non-zero slip value such that the clutch is not synchronized. In preparation for the shift event, the slip speed is reduced toward zero. Based upon known methods, a time 414 can be estimated whereat the slip speed will equal zero or be below some threshold low value such that the clutch is considered synchronized. Plot 406 illustrates an on-off hydraulic control switch command, with the same horizontal time axis for the rest of the plots on the graph and with a zero or off value defined by the left vertical axis. A required clutch fill time can be determined to estimate a time that will be required to transition the clutch from an initial disengaged, exhausted state to a touching state wherein the clutch is filled. Such a value can be estimated, calculated, or modeled according to any method sufficient to accurately predict operation of the clutch and the hydraulic control system, and a plurality of equations or parameter sets can be utilized for a variety of operating conditions. In the alternative, a value for a required clutch fill time can be pre-calculated and stored in a retrievable format, such as in a look-up table. Based upon the estimated time 414 and the required clutch fill time, a time 412 whereat or before which the on-off hydraulic control switch should be activated can be determined Plot 404 illustrates a clutch pressure, for example, measured within a fill volume of the clutch, with the same horizontal time axis for the rest of the plots on the graph and with a zero value defined by the left vertical axis. At the outset of the test, the clutch pressure is substantially zero. At time 412 when the on-off hydraulic control switch is actuated, pressurized hydraulic fluid begins to flow into the clutch. However, because the fluid is filling an empty volume, pressure within the clutch does not yet begin to rise substantially. The on-off hydraulic control switch is maintained in an actuated state. At time 414, the clutch is filled, and pressurized fluid entering the clutch begins to compress or provide clamping force for plates of the clutch. At this point, the clutch pressure begins to rise. Plot 408 illustrates a clutch state that can be diagnosed for the clutch, with the same horizontal time axis for the rest of the plots on the graph and with arbitrary values assigned for different clutch states. Plot 408 includes four defined states, from left to right, with a first state, a disengaged clutch state; a second state, a near synchronized state; a third state, a synchronized state; and a fourth state, an engaged clutch state. As the test progresses and as the clutch pressure increases, a clutch torque capacity of the clutch increases, such that the clutch can transmit more reactive torque at a time 416, the clutch can be estimated to have achieved the engaged clutch state, wherein the clutch can transmit torque according to a minimum required clutch torque capacity for the clutch. Plot 410 illustrates torque transferred through the clutch, with the same horizontal time axis for the rest of the plots on the graph and with a zero value defined by the left vertical axis. At time 416, torque can be increased and transferred through the clutch. FIG. 4 illustrates exemplary behavior of a clutch and hydraulic control system executing a shift event according to the methods disclosed herein.

Figure 5:
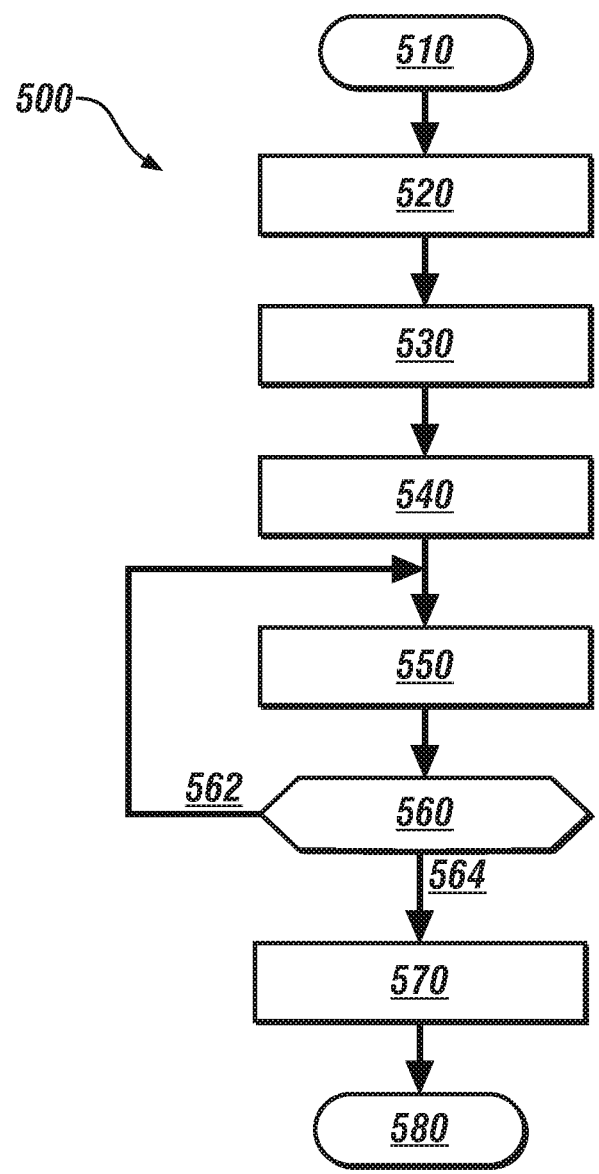
FIG. 5 illustrates an exemplary process to execute a shift, in accordance with the present disclosure.

FIG. 5 illustrates an exemplary process to execute a shift. Table 2 is provided as a key wherein the numerically labeled blocks and the corresponding functions are set forth as follows.

TABLE 2

| BLOCK | BLOCK CONTENTS |
| --- | --- |
| 510 | Start Shift Sequence |
| 520 | Determine Time at Which Clutch Will Be Synchronized |
| 530 | Acquire Required Clutch Fill Time |
| 540 | Actuate On-Off Hydraulic Control Switch to Pressurize Clutch Based Upon Coordinating Clutch Synchronization and Filling the Clutch to the Touch Point |
| 550 | Determine Clutch Torque Capacity |
| 560 | Does the Clutch Torque Capacity Exceed a Minimum Required Clutch Torque Capacity? |
| 570 | Permit Torque Transfer Through the Clutch |
| 580 | End Shift Sequence |

Process 500 begins at block 510 whereat a shift sequence is started. At block 520, a time is determined according to methods disclosed herein whereat the transmission clutch being engaged will be synchronized. At block 530, a required clutch fill time, the time that the hydraulic control system will take to fill the clutch to the touching point, is acquired by method disclosed herein. At block 540, an on-off hydraulic control switch controlling hydraulic flow to the clutch is actuated based upon the time of synchronization and the required clutch fill time, such that hydraulic flow resulting from the actuation will result in the clutch being filled at approximately the same time as the clutch is synchronized. As the on-off hydraulic control switch remains activated, pressure within the clutch cylinder continues to build toward the hydraulic line pressure of the hydraulic control system, resulting in the clutch torque capacity increasing as the clutch plates are compressed. At block 550, the clutch torque capacity is determined or estimated. At block 560, a determination is made whether the clutch has enough torque capacity to permit the transfer of torque through the clutch. If block 560 results in a determination that the clutch does not have sufficient torque capacity, then process 500 follows path 562 to block 550 whereat the clutch torque capacity is iteratively re-determined. If block 560 results in a determination that the clutch does have sufficient torque capacity, then process 500 follows path 564 to block 570, whereat torque is permitted to the transferred through the clutch. The shift sequence then ends at block 580. Process 500 is an exemplary process to execute a shift according to methods disclosed herein, however, a number of alternative processes are envisioned, and the disclosure is not intended to be limited to the particular exemplary embodiments provided herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A control module-implemented method to control a transmission through a shift event, the transmission comprising a plurality of synchronously operated clutches selectably transmitting torque from a torque generative device to an output member, the method comprising:
executing in the control module the following steps:
monitoring a desired shift event comprising monitoring a clutch to be engaged;
determining a time at which the clutch to be engaged will be synchronized;
determining a required clutch fill time for the clutch to be engaged; and
actuating a binary on-off hydraulic control switch to commence providing pressurized hydraulic fluid to the clutch to be engaged at the beginning of the clutch fill time and based upon coordinating the time at which the clutch to be engaged will be synchronized simultaneously with the end of the required clutch fill time, wherein a pressure within the clutch to be engaged transitions the clutch to be engaged into a touching state wherein the clutch is filled when the binary on-off switch is actuated;
operating the clutch to be engaged in a synchronized state until the pressure within the clutch to be engaged is sufficient to allow for a clutch torque capacity which exceeds a minimum required clutch torque capacity; and
permitting torque to be transferred through the clutch when clutch torque capacity exceeds the minimum required clutch torque capacity.

2. The method of claim 1, further comprising:
subsequent to synchronization of the clutch to be engaged, iteratively determining a clutch torque capacity for the clutch to be engaged;
comparing the clutch torque capacity to a minimum required clutch torque capacity; and
utilizing the clutch to be engaged to transfer torque based upon the comparing.

3. The method of claim 1, wherein the required clutch fill time is determined according to a computational model of the clutch.

4. The method of claim 1, wherein the required clutch fill time is determined by referencing a look-up table.

5. The method of claim 1, wherein the binary on-off hydraulic control switch is hydraulically actuated.

6. The method of claim 1, wherein the binary on-off hydraulic control switch comprises an electromechanical solenoid.

7. The method of claim 1, wherein the binary on-off hydraulic control switch comprises a servo motor.

8. The method of claim 1, wherein actuating the binary on-off hydraulic control switch comprises actuating the on-off hydraulic control switch such that the clutch to be engaged will be synchronized before the clutch to be engaged is filled.

9. The method of claim 1, further comprising:
during the desired shift event, maintaining a drive torque to the output member by transmitting torque through a second clutch.

10. The method of claim 9, further comprising providing the drive torque with an engine; and wherein synchronization of the clutch to be engaged is effected with torque from an electric machine.

11. A control module-implemented method to control a transmission through a shift event, the transmission comprising a plurality of synchronously operated clutches selectably transmitting torque from a torque generative device to an output member, the method comprising:
  executing in the control module the following steps:
    monitoring a desired shift event comprising:
      identifying a clutch to be engaged in the desired shift event; and
      monitoring a time at which the clutch to be engaged will be synchronized;
    determining through a computational model of the clutch a required clutch fill time for the clutch to be engaged;
    actuating a binary on-off hydraulic control switch to commence providing pressurized hydraulic fluid to the clutch to be engaged at the beginning of the clutch fill time and-coordinating the time at which the clutch to be engaged will be synchronized simultaneously with the end of the required clutch fill time, wherein pressure within the clutch to be engaged transitions the clutch to be engaged into a touching state wherein the clutch is filled when the binary on-off hydraulic control solenoid is actuated;
    maintaining the binary on-off hydraulic control switch in an actuated state;
    iteratively determining a clutch torque capacity for the clutch to be engaged;
    operating the clutch to be engaged in a synchronized state until the clutch torque capacity exceeds a minimum required clutch torque capacity.

12. Apparatus to control a transmission through a shift event, the transmission comprising a plurality of synchronously operated clutches selectably transmitting torque from a torque generative device to an output member, the apparatus comprising:
  a selected one of the plurality of clutches to be engaged during the shift event;
  a hydraulically actuated binary on-off hydraulic control switch controlling a flow of pressurized hydraulic fluid to the selected clutch; and
  a control module configured to:
    monitor a desired shift event comprising monitoring the selected clutch,
    determine a time at which the selected clutch will be synchronized,
    determine a required clutch fill time for the selected clutch, and
    actuate the binary on-off hydraulic control switch at the beginning of the clutch fill time and coordinating the time at which the selected clutch will be synchronized with the end of the required clutch fill time, wherein pressure within the clutch to be engaged transitions the clutch to be engaged into a touching state wherein the clutch is filled when the binary on-off hydraulic control switch is activated;
    operate the selected clutch in a synchronized state until the pressure within the selected clutch is sufficient to allow for a clutch torque capacity which exceeds a minimum required clutch torque capacity; and
    permit torque to be transferred through the selected clutch when the clutch torque capacity exceeds the minimum required clutch torque capacity.

* * * * *